United States Patent [19]

Morrison

[11] 3,923,641

[45] Dec. 2, 1975

[54] HYDROCRACKING NAPHTHAS USING ZEOLITE BETA

[75] Inventor: Roger A. Morrison, West Deptford, N.J.

[73] Assignee: Mobil Oil Corporation, New York, N.Y.

[22] Filed: Feb. 20, 1974

[21] Appl. No.: 444,221

[52] U.S. Cl. ........... 208/111; 252/455 Z; 260/676 R
[51] Int. Cl.² ..................... C10G 13/04; B01J 29/28
[58] Field of Search .................. 208/111; 260/676 R

[56] References Cited
UNITED STATES PATENTS

| | | |
|---|---|---|
| 3,308,069 | 3/1967 | Wadlinger et al. .............. 252/455 Z |
| 3,432,568 | 3/1969 | Miale et al. ...................... 260/676 R |
| 3,516,925 | 6/1970 | Lawrance et al. .................. 208/111 |
| 3,776,838 | 12/1973 | Youngblood et al. ................ 208/74 |
| 3,812,199 | 5/1974 | Chen et al. ....................... 260/676 R |

*Primary Examiner*—Delbert E. Gantz
*Assistant Examiner*—G. E. Schmitkons
*Attorney, Agent, or Firm*—C. A. Huggett; R. W. Barclay; C. E. Setliff

[57] ABSTRACT

$C_5^+$ naphthas, especially $C_7^+$ naphthas, may be selectively hydrocracked to yield a high isobutane-normal butane ratio by contacting the naphtha with a zeolite beta within the temperature range of from about 400° to about 550°F.

6 Claims, No Drawings the following composition:

where X is a number of the approximate range of 0.5–20. This material may be prepared by reaction of ethyl orthosilicate and sodium aluminate. Another suitable source of alumina and sodium oxide is the solution of aluminum turnings in an alkali. Tetraethylammonium aluminates can also be used. Silica present in the reaction mixture may be derived from a variety of sources, for example, silica gel, silica hydrosol, and silicate esters.

Catalytic materials can be prepared by calcining the original sodium form of zeolite beta and/or by replacing the major portion of the sodium in the zeolite with other metallic and/or ammoniacal ions. If the calcination is carried out prior to ion exchange, some or all of the resulting hydrogen ions can be replaced by metal ions in the ion exchange process. For hydrocracking, the catalyst will preferably have associated therewith a metal of Groups 5b, 6b or 8 of the Periodic Table and such metal may either be in the cation of the zeolite or deposited on the surface of the zeolite when the latter is characterized by a cracking activity. That is to say the ion may be exchanged into the zeolite or deposited onto it by impregnation.

The composition contemplated for use herein include not only the sodium form of zeolite beta as synthesized from a sodium-aluminum-silicate-tetraethylammonium-water system with sodium as the exchangeable cation but also crystalline materials obtained from such a zeolite by partial or complete replacement of the sodium ion with other cations. The sodium cations can be replaced, at least in part, by other ions including those of metals below sodium in the electromotive series, calcium, ammonium, hydrogen and combinations of such ions with one another. Particularly preferred for such purpose are the alkaline earth metal ions; Group 2 metal ions, ions of the transition metals such as manganese and nickel, the rare earth metals such as cerium, lanthanum, praseodymium, neodymium, samarium and mixtures thereof with each other and the other rare earth; and other ions, for example, hydrogen and ammonium which behave in zeolite beta as metals in that they can replace metal ions without causing any appreciable change in the basic structure of the zeolite crystal. The transition metals are those whose atomic numbers are from 21 to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, platinum, hafnium, tantalum, tungsten, rhenium, osmium and iridium.

Ion exchange of the sodium from the zeolite beta may be accomplished by conventional means. A preferred method is to pack zeolite beta into a series of vertical columns and to successively and continuously pass through the beds a water solution of a soluble salt of the cation to be introduced into the zeolite changing the flow from the first bed to the second bed as the zeolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations.

Highly active hydrocracking zeolite beta may be obtained by treating the above-described crystalline zeolite beta with a fluid medium containing a hydrogen ion or ion capable of conversion to a hydrogen ion in an amount sufficient to impart catalytic properties thereto. The catalysts so obtained can be used in extremely small concentrations, and this permits hydrocracking to be carried out under practicable and controllable rates at temperatures much lower than those previously employed. These catalysts furthermore can be used directly as the sole catalytic constituent or as intermediates in the preparation of further modified contact masses having catalytic properties. Such modified contact masses may comprise the treated crystalline zeolite per se or a dispersed mixture of the treated aluminosilicates with a predetermined amount of a low activity and/or catalytically active material which serves as a binder or matrix for the catalyst constituent.

The high activity catalysts contemplated are obtained by contacting zeolite beta with a fluid medium containing hydrogen ions or ions capable of conversion thereto, washing the treated material free of soluble anions, and thereafter drying and thermally activating the product by heating at temperatures ranging from about 400°F to 1,700°F or higher for a period between about one to 48 hours. The resulting product is an activated aluminosilicate, strongly acidic in character, which contains less than about 10 percent by weight metal and substantially corresponds to the hydrogen form of the zeolite beta precursor material. When subsequently used alone or dispersed or otherwise intimately admixed with a suitable matrix, such as an inorganic oxide gel, the resulting product has been found to be active as a catalyst for hydrocarbon conversion. When so combined, the particle size of the zeolite is less than about 40 microns.

The catalysts may be used as such or as intermediates in the preparation of further modified contact masses comprising low activity or catalytically active materials which serve as a support or matrix for the aluminosilicate. The catalyst may be used in powdered, granular or molded state formed into spheres or pellets of finely divided particles having a particle size of 2–500 mesh. In cases where the catalyst is molded, such as by extrusion, the aluminosilicate may be extruded before drying, or dried or partially dried and then extruded. The catalyst product is then preferably precalcined in an inert atmosphere or may undergo calcination initially during use in the conversion process. Generally, the composition is dried between 150°F and 600°F and thereafter calcined in air or steam or an inert atmosphere of nitrogen, hydrogen, helium, flue gas or other inert gas at temperatures ranging from 400°F to 1,700°F for periods of time ranging from one to 48 hours or more. This heating step is known as thermal activation of the catalyst.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of 1/16 inch to ⅛ inch size, for example, obtained upon pelleting, casting, or extruding in accordance with well known techniques.

The hydrocracking process using zeolite beta can be run under a variety of conditions. The pressure may vary from 0 to about 2,000 psig, but will preferably be from about 300 to about 800 psig. The temperature of reaction is preferably from about 450° to about 550°F, but may range from about 400° to about 650°F. The hy-

HYDROCRACKING NAPHTHAS USING ZEOLITE BETA

BACKGROUND OF THE INVENTION

1. Field of the Invention

The invention relates to a process of hydrocracking hydrocarbons. In particular it relates to hydrocracking naphthas using a zeolite beta.

2. Discussion of the Prior Art

The problem of lowered yields of isobutane when zeolite catalysts are used in cracking hydrocarbons is recognized in U.S. Pat. No. 3,776,838. It is disclosed therein by patentees that their cracking process upgrades naphtha streams for use in gasoline blending and supplies additional quantities of $C_4$ and lighter hydrocarbons. However, the maximum yield of isobutane in the examples given is 21.8 percent and that of n-butane in the same example is 5.7 percent. Thus in the cracking process of this patent the ratio of isobutane to n-butane in such example is a mere 3.8. As will become apparent hereinafter, these represent about what can be expected from the usual zeolite catalysts in a hydrocracking process. The catalyst of U.S. Pat. No. 3,776,838 is natural or synthetic type X or Y zeolite.

U.S. Pat. No. 3,308,069 is concerned with zeolite beta per se. There is, though, no suggestion that zeolite beta can be used with $C_5^+$ naphthas in low temperature conditions to yield high ratios of isobutane to n-butane.

SUMMARY OF THE INVENTION

In accordance with the present invention, there is provided a process of hydrocracking $C_5^+$ naphtha by contacting said naphtha with a zeolite beta at from about 400°F to about 650°F, whereby improved selectivity of isobutane over n-butane or higher yields of isobutane and n-propane is obtained.

DESCRIPTION OF SPECIFIC EMBODIMENTS

The crystalline synthetic material, zeolite beta, useful in the present invention, has the calculated composition:

[XNa (1.0±0.1−X)TEA]$AlO_2 \cdot YSiO_2 \cdot WH_2O$ where X is less than 1, preferably less than 0.75; TEA represents tetraethylammonium ion; Y is greater than 5 but less than 100 and W is up to about 4 depending on the condition of dehydration and on the metal cation present. The TEA component is calculated by difference from the analyzed value of sodium and the ultimate theoretical cation to Al ratio is 1.0/1.

Another useful embodiment of zeolite beta has the composition:

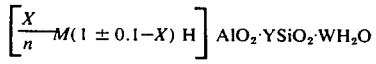

where X, Y and W have the values listed above and $n$ is the valence of the metal M which can be any metal, preferably a metal of groups 1a, 2a, 3a or one of the transition metals or mixtures thereof as shown in the Mendeleeff periodic chart.

Still another embodiment of zeolite beta has the composition:

where X, Y, W, $n$ and M have the values listed above. This form of the catalyst is obtained from the initial sodium form of zeolite beta by ion exchange without calcining.

Thus, zeolite beta is formed by crystallization from a reaction mixture containing the tetraethylammonium ion. Upon heating of the product at a temperature in the approximate range of 400°–1700°F or higher, the tetraethylammonium ion undergoes degradation to the hydrogen ion. Furthermore, in this case the value of W in the formula may be essentially 0.

It is a particualr feature of zeolite beta that it is prepared from reaction mixtures containing tetraethylammonium hydroxide as the alkali and more specifically by heating in aqueous solution a mixture of the oxides or of materials whose chemical compositions can be completely represented as mixtures of the oxides $Na_2O$, $Al_2O_3$, $[C_2H_5]_4N]_2O$, $SiO_2$ and $H_2O$ suitably at a temperature of about 75° to 200°C until crystallization occurs. The composition of the reaction mixture, expressed in terms of mol ratios, preferably falls within the following ranges:

$SiO_2/Al_2O_3$ — from about 10 to about 200
$Na_2O$/tetraethylammonium hydroxide (TEAOH) — from about 0.0 to 0.1
$TEAOH/SiO_2$ — from about 0.1 to about 1.0
$H_2O/TEAOH$ — from about 20 to about 75.

The product which crystallizes from the hot reaction mixture is separated, suitably by centrifuging or filtration, washed with water and dried. The material so obtained may be calcined by heating in air or an inert atmosphere at a temperature in the approximate range of 400°–1,700°F or higher so long as the temperature is not sufficient to destroy crystallinity thereof.

In making zeolite beta, the method comprises reacting, in aqueous media, amorphous silica solids or sols and a soluble aluminate along with aqueous solutions of tetraethylammonium hydroxide. The aluminate may be sodium aluminate or tetraethylammonium aluminate. Amorphous silica-alumina solids may be used as the source of the silica and alumina. The reaction mixture is initially continuously or periodically stirred to insure homogeneity. After mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperatures within the range of from about 75°C to about 200°C. The pressure during crystallization is atmospheric or at least that which corresponds to the vapor pressure of water in equilibrium with the mixture of reactants. Heating is continued until desired crystalline zeolite product is formed. The zeolite crystals are then separated from the mother liquor and washed, preferably with distilled water.

In the synthesis of zeolite beta, it has been found that the composition of the reaction mixture is critical. Specifically, the presence of tetraethylammonium ions in such mixture has been found to be essential for the production of zeolite beta. In the absence of such ions or even in the presence of quaternary ammonium ions other than tetraethyl, no zeolite beta was obtained.

Sodium oxide present in the reaction mixture may be derived from sodium aluminate or an amorphous sodium aluminosilicate gel. The latter is characterized by Table 3-continued

|  | Example 8 | Example 9 | Example 10 |
|---|---|---|---|
| Wt.% iso-$C_4$ | 12.5 | 2.6 | 7.2 |
| Wt.% n-$C_4$ | 13.1 | 1.9 | 5.9 |
| iso-$C_4$/n-$C_4$ | 0.95 | 1.4 | 1.22 |

\* ZSM-5 is described in U.S. Patent 3,702,886
\*\* Mordenite containing the tetraethylammonium ion as synthesized

I claim:

1. A process for hydrocracking a $C_5^+$ naphtha which comprises contacting said naphtha with a zeolite beta at a temperature of from about 400°F to about 550°F, at a space velocity of from about 0.1 to about 20 and at a hydrogen to hydrocarbon ratio of from about 1 to 1 to about 1 to 15, such that the final product has a i-$C_4$ to n-$C_4$ ratio of at least 7.

2. The process of claim 1 wherein the naphtha is a $C_7^+$ naphtha.

3. The process of claim 1 wherein the zeolite beta contains therein a metal cation of the group consisting of Groups 5b, 6b and 8 of the Periodic Table.

4. The process of claim 3 wherein the metal cation is platinum.

5. The process of claim 3 wherein said metal cation is present to the extent of from 0.1 percent by weight to 2.0 percent by weight.

6. The process of claim 1 wherein the pressure during hydrocracking is from about 0 psig to about 2,000 psig.

\* \* \* \* \* drogen to hydrocarbon ratio, in a mole basis, can run from 1 to 1 to about 15 to 1, preferably from about 3 to 1 to about 7 to 1. Weight hour space velocities (WHSV) may be from about 0.5 to about 20, preferably from about 1 to about 3.

ILLUSTRATIVE EXAMPLES

The following examples will illustrate the invention. As typical, Example 1 will be described in detail. The products of the remaining examples were similarly prepared.

EXAMPLE 1

A 7/16 inch × 10 inches stainless steel reactor was packed with 3 inches of 30 × 60 mesh quartz chips as a preheater zone and 4 inches (10 cc = 4.34g) of 30 × 60 mesh 1% Pt H-beta catalyst. The catalyst was separated from the quartz by a layer of glass wool. The reactor was fitted with a thermowell positioned in the center of the reactor so that temperature was measured along the entire reactor length.

The reactor was placed in a unit capable of feeding both charge stock and hydrogen continuously under pressure.

The catalyst was pretreated at 900°F and 500 psig for one hour at a hydrogen rate of 95 cc per minute. The temperature was lowered to 420°F and 6.38 cc per hour of Udex Raffinate plus 95 cc per minute of $H_2$ were charged to the reactor.

After 3 hours on stream, a material balance was made by condensing the products in a liquid nitrogen trap for one hour. The products were analyzed by chromatography. The results for this Example, as well as Examples 2–4, are shown in Table 1.

The Udex Raffinate used in Examples 1–3 had the following characteristics:

| Paraffins | Wt. % |
|---|---|
| $C_5$'s | 7.0 |
| $C_6$'s | 35.3 |
| $C_7$'s | 47.0 |
| $C_8$'s | 7.0 |
| $C_9$'s | 0.1 |
| Aromatics | |
| $C_6$ | 0.3 |
| $C_7$ | 2.6 |
| $C_8$ | 0.7 |
| | 100.0 |

The 210°–365°F naphtha of Examples 4–10 had the characteristics listed below:

| Carbon No. Distribution | Wt. % |
|---|---|
| $C_7$ | 21.6 |
| $C_8$ | 39.6 |
| $C_9$ | 16.4 |
| $C_{10}$ | 14.9 |
| $C_{11}$ | 7.5 |
| | 100.0 |

It will be observed that 10 cc (about 4g) of catalyst was used in Example 1. In the other examples wherein the WHSV is 1, the same amount of catalyst was used. In those examples having WHSV's of 5 and above, the weight of catalyst was 2g or less, about 2g being used at a WHSV of 5 and smaller amounts at WHSV's of 10 and 20.

In all examples wherein a metal appears in the catalyst, such metal was placed onto the catalyst by impregnation.

Table 1

| | Example 1 | Example 2 | Example 3 | Example 4 |
|---|---|---|---|---|
| Feed | $C_5$–$C_9$ Udex Raffinate | $C_5$–$C_9$ Udex Raffinate | $C_5$–$C_9$ Udex Raffinate | 210–365°F Naphtha |
| Catalyst | 1% Pt H-Beta | H-Beta | 1% Pt H-Beta | H-Beta |
| Temp. °F | 420 | 525 | 525 | 525 |
| Pressure, psig | 500 | 490 | 500 | 500 |
| WHSV | 1 | 5 | 5 | 1 |
| $H_2$/HC | 5/1 | 5/1 | 5/1 | 10/1 |
| Wt. % n-$C_3$ | 2.9 | 0.3 | 18.4 | 0.8 |
| Wt. % iso-$C_4$ | 5.6 | 1.6 | 27.7 | 5.7 |
| Wt. % n-$C_4$ | 0.8 | 0.1 | 2.5 | 0.8 |
| iso-$C_4$/n-$C_4$ | 7.2 | 12.3 | 11.1 | 7.1 |

At temperatures higher than those specified for good results, combined with high WHSV's or $H_2$/HC ratio, or both, and also combined with the use of naphthas containing $C_5$–$C_6$ components, the iso $C_4$ yield is generally high, but the iso-$C_4$/n-$C_4$ ratio is low. Good yields of n-$C_3$ are obtained. Table 2 illustrates this.

Table 2

| | Example 5 | Example 6 | Example 7 |
|---|---|---|---|
| Feed | 210–365°F Naphtha | Same | Same |
| Catalyst | 1% Pt H-Beta | Same | Same |
| Temp.°F | 676 | 700 | 625 |
| Pressure, psig | 500 | 800 | 487 |
| WHSV | 10 | 20 | 5 |
| $H_2$/HC | 5/1 | 2.5/1 | 10/1 |
| Wt.% n-$C_3$ | 22.6 | 17.7 | 16.3 |
| Wt.% iso-$C_4$ | 31.8 | 25.7 | 35.6 |
| Wt.% n-$C_4$ | 16.2 | 14.4 | 11.6 |
| iso-$C_4$/n-$C_4$ | 2.0 | 1.8 | 3.1 |

Illustrative of the zeolites which are not significantly selective in their yield of isobutane are the following:

Table 3

| | Example 8 | Example 9 | Example 10 |
|---|---|---|---|
| Feed | 210–365°F Naphtha | Same | Same |
| Catalyst | Ni-ZSM-5* | 0.5% Ni TEA Mordenite** | 0.7% Pt ZSM-5* |
| Temp. °F | 575 | 525 | 515 |
| Pressure, psig | 500 | 500 | 500 |
| WHSV | 1 | 1 | 1 |
| $H_2$/HC | 10/1 | 10/1 | 10/1 |
| Wt.% n-$C_3$ | 24.6 | 2.2 | 9.5 |